United States Patent [19]

Okuda

[11] Patent Number: 5,319,625
[45] Date of Patent: Jun. 7, 1994

[54] APPARATUS USING DEMODULATORS TO DETECT CROSSTALK FROM A SIGNAL READ FROM A RECORDING MEDIUM

[75] Inventor: Yoshiyuki Okuda, Tokorozawa, Japan

[73] Assignee: Pioneer Electronic Corporation, Tokyo, Japan

[21] Appl. No.: 23,121

[22] Filed: Feb. 26, 1993

[30] Foreign Application Priority Data

Mar. 5, 1992 [JP] Japan ................................... 4-48673

[51] Int. Cl.⁵ .............................................. G11B 7/00
[52] U.S. Cl. .................................. 369/53; 369/44.26; 369/44.34; 369/44.35; 369/54; 369/111; 369/124; 358/340
[58] Field of Search ............... 358/36, 167, 328, 340, 358/342; 360/33.1, 34.1, 77.02–77.03, 77.06, 77.08; 369/47–48, 53, 54, 58, 107, 111, 124, 43, 44.26, 44.34–44.36

[56] References Cited

U.S. PATENT DOCUMENTS 4,001,702 1/1977 Kaufman .
5,065,253 11/1991 Ishii ........................................ 358/340
5,067,026 11/1991 Kaneko ................................. 358/340

FOREIGN PATENT DOCUMENTS 59-168835 11/1984 Japan .
437384 2/1992 Japan .

Primary Examiner—W. R. Young
Attorney, Agent, or Firm—Sughrue, Mion, Zinn, Macpeak & Seas

[57] ABSTRACT

This invention relates to a crosstalk detecting apparatus for detecting crosstalk which can occur when an image signal FM-modulated and recorded on a recording medium is read. The crosstalk detecting apparatus calculates a valve indicative of the amount of crosstalk originating from an adjacent track based on a signal read by a pickup, utilizing a simple construction. The cross-talk detecting apparatus according to the present invention is adapted to detect crosstalk during a period in which an identification signal recorded on the medium is being read therefrom, and comprises an FM-demodulator for demodulating the signal read from the medium, an AM-demodulator for demodulating the signal read from the medium, a multiplier circuit for multiplying the signal output from the FM-demodulator with the signal output from the AM-demodulator and an averaging circuit for averaging the values output by the multiplier circuit.

2 Claims, 3 Drawing Sheets

APPARATUS USING DEMODULATORS TO DETECT CROSSTALK FROM A SIGNAL READ FROM A RECORDING MEDIUM

BACKGROUND OF THE INVENTION

This invention relates to a crosstalk detecting apparatus for detecting the crosstalk which may arise from an adjacent track and of a recording medium when an image signal that has been FM-modulated and recorded on the recording medium is read out.

A high definition signal having 1,125 horizontal scanning lines per frame requires a much wider frequency band in comparison to an NTSC signal having 525 horizontal scanning lines. Specifically, a frequency band of approximately 30 MHz is needed.

One method of recording such a wide-band high-definition signal on an optical disk or the like is disclosed in Japanese Patent Application No. 2-143589, entitled "Apparatus and Recording Medium for Recording High-Vision Signal".

According to this prior art, three tracks on a recording medium are used simultaneously to accumulatively process an inputted high-definition signal, which is then divided for every three consecutive scanning lines. Signals corresponding to the divided three scanning lines are recorded on the three tracks in a corresponding relationship. In other words, the simultaneous use of the three tracks causes a sweeping time to be multiplied by a factor of three, which in turn, allows the frequency band for the recorded signals to be reduced to ⅓.

When an image signal is recorded on a recording medium, a signal specific having a different level for each of the three tracks (this signal is hereinafter referred to as an identification signal) is added to the image signal in order to identify the three different tracks during reproduction of the signal. The composite signal is then FM-modulated and recorded on the recording medium. Thus, for a period corresponding to the added identification signal a reproduced output contains an FM wave generated when the identification signal was FM-modulated. The FM wave of different frequency is reproduced for each of the three tracks. When using the described three-track arrangement to read out signals from a recording medium on which FM-modulated signals have been recorded, pickups for reading out the signals must be controlled to perpendicularly face the tracks. Generally, for controlling a pickup to face a track correctly, a servo system is employed which detects signals indicative of displacement of the pickup from the perpendicularly facing position of the track, and the moves the pickup so as to reduce the displacement to 0.

The present invention provides an apparatus for detecting a signal corresponding to the above-mentioned signals indicative of a displacement. Conventionally, as described in Japanese Laid-open Utility Model Application No. 59-168835, entitled "Apparatus for Optically Reading Information", light emitted from a light emitting element and reflected by the disk surface is received by a pair of light receiving elements associated with the light emitting element, and the difference between their output signals is output as a displacement.

Conventionally, therefore, the displacement signal is obtained from the difference between output signals from two light receiving elements associated with a light emitting element. For this purpose, the light emitting element and light receiving elements must be placed at highly precise positions, which must be performed by an expert. Also, even if an outputted displacement signal indicates zero, some of the signal read by a pickup may be mixed with crosstalk from an adjacent track.

SUMMARY OF THE INVENTION

An object of the present invention is to provide a crosstalk detecting apparatus which is capable of accurately detecting a crosstalk amount originating from an adjacent track and contained in a signal read by a pickup.

The present invention provides a crosstalk detecting apparatus for detecting an amount of crosstalk which occurs when a signal is read from a medium, on which an image signal and an identification signal are FM-modulated and recorded using three tracks adjacent to one another, for a period in which the identification signal recorded on the medium is being read therefrom, said apparatus comprising:

(a) FM demodulating means for FM-demodulating the signal read from the medium;

(b) AM demodulating means for AM-demodulating the signal read from the medium;

(c) multiplying means for multiplying an output signal from said FM demodulating means with an output signal from said AM demodulating means; and (d) averaging means for averaging output values from said multiplying means.

In the crosstalk detecting apparatus according to the present invention, the multiplying means outputs a signal representing the product of the output of the FM-demodulating means and the output of the AM-demodulating means. Then, in the averaging means, the output of the multiplying means is averaged for the period in which the identification signal is being read, to output a crosstalk value.

In this manner, a signal read from a medium is FM-demodulated on the one hand and AM-demodulated on the other hand. The FM-demodulated output and the AM-demodulated output are multiplied with each other, and a crosstalk value is derived from an average of the multiplication result over time, so that the apparatus can be made simple in construction while accurately outputting the crosstalk amount.

The above and other objects and advantages will become more readily apparent when reference is made to the following description taken in conjunction with the accompanying drawings.

DESCRIPTION OF THE PREFERRED EMBODIMENTS

Figure 1:
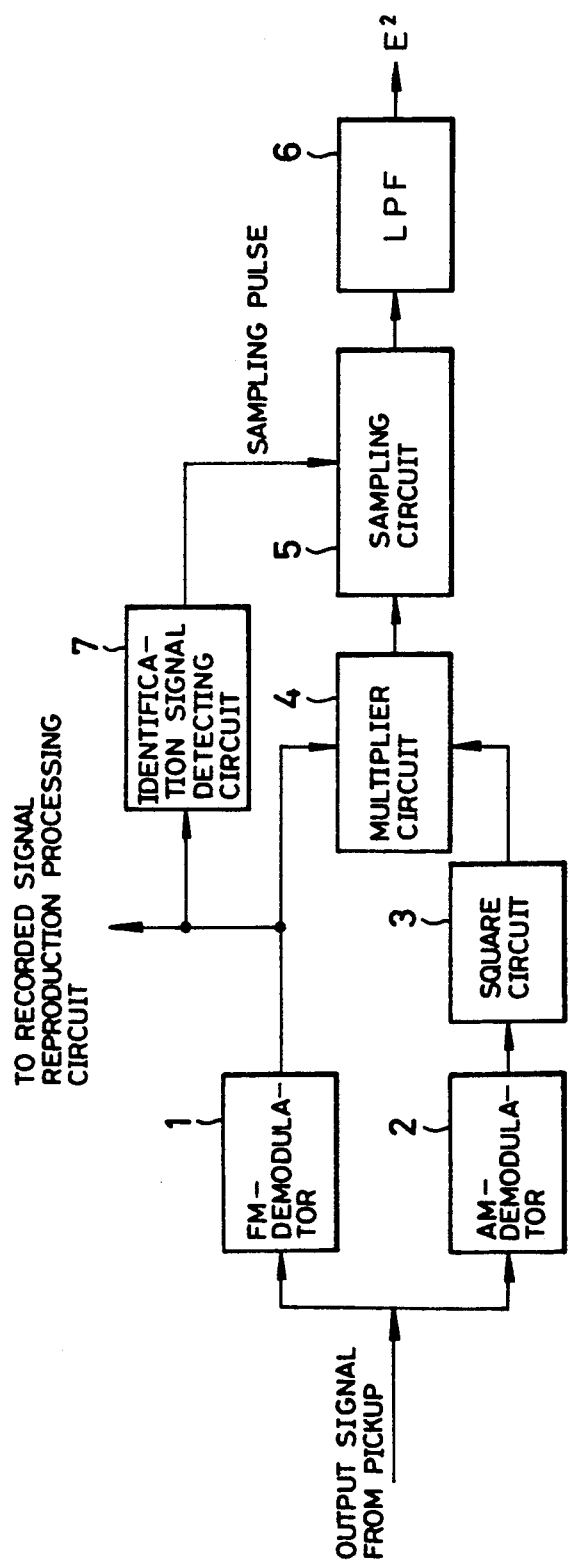
FIG. 1 is a block diagram showing the configuration of an embodiment of a crosstalk detecting apparatus according to the present invention.

An embodiment of the present invention will hereinafter be described with reference to FIG. 1. In FIG. 1, a crosstalk detecting apparatus according to the present invention comprises an FM demodulator 1, an AM demodulator 2, a square circuit 3, a multiplier circuit 4, a sampling circuit 5, an averaging circuit 6 and an identification signal detecting circuit 7. For example, the averaging circuit 6 comprises a low pass filter (LPF) in this embodiment.

An output signal read by a pickup is divided into, for example, two signals, one of these signals is supplied to the FM-demodulator 1, then is demodulated by the same, and finally is processed by a signal processing circuit, not shown, to reproduce an image signal.

The other signal is supplied to the AM-demodulator 2, where amplitude fluctuations of the carrier thereof are demodulated by the AM-demodulator and squared by the square circuit 3.

The multiplier circuit 4 is supplied with an output of the FM-demodulator 1 and an output of the square circuit 3, and outputs the product of these two inputs, which is then supplied to the sampling circuit 5.

The sampling circuit 5 samples the signal from the multiplier circuit 4 with a sampling pulse which is a pulse indicative of the period in which the identification signal detected by the identification signal detecting circuit 7 is being read. The sampled signal is supplied to the LPF 6.

The LPF 6 removes fluctuation components of the sampled signal and outputs fixed components thereof as a crosstalk value.

The principle of the present invention will be described with reference to FIGS. 2(A) and 2(B).

Figure 2A:
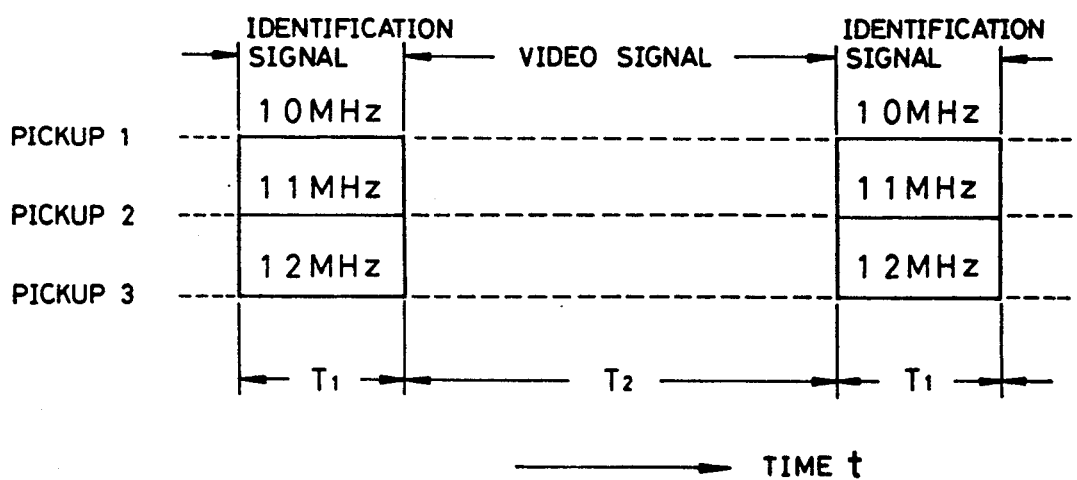
FIG. 2(A) is a diagram showing outputs derived by an information reading method utilizing an apparatus according to the present invention.

FIG. 2(A) illustrates output signals output by the pickups 1-3 when signals are read from three different tracks on a recording medium.

During a period indicated by the identification signal read by each pickup, FM-waves are output by each pickup 1-3. For example, an FM-wave at 10 MHz is outputted from the pickup 1, and FM-waves at 11 MHz and 12 MHz are outputted from the pickups 2 and 3, respectively.

During a video signal period, respective FM-modulated video signals are output.

When a pickup is in normal position relative to a track on a recording medium, crosstalk will not occur from any adjacent track. However, for example, when the optical axis of the pickup 2 is inclined to cause coma aberration and consequently crosstalk originates from a track 1, a resulting output $y_{21}$ from the pickup 2 when reading the identification signal is expressed by:

$$y_{21} = a_2 \cos\omega_2 t + ka_1\cos\omega_1 t \qquad (1)$$
$$= a\cos\omega_2 t + m\cos\omega_1 t$$

The equation (1) may be rewritten in vector fashion with $\cos\omega_2 t$ serving as a reference vector:

$$y_{21} = a + m\cos(\omega_2 - \omega_1)t + jm\sin(\omega_2 - \omega_1)t \qquad (2)$$
$$= a + m\cos\omega t + jm\sin\omega t$$

Figure 2B:
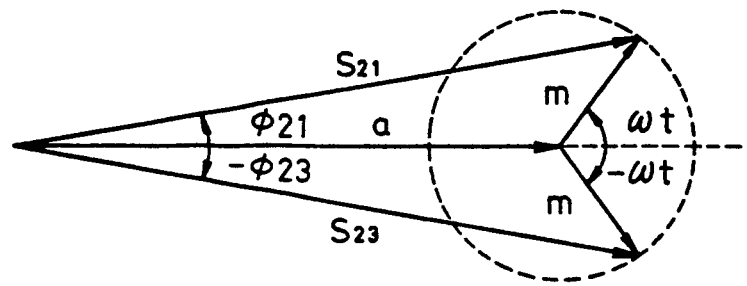
FIG. 2(B) is a diagram showing the principle of the present invention.

Specifically, the equation (2) represents, as shown in FIG. 2(B), that a vector having a value m rotates anticlockwise with respect to the reference vector designated by a at an angular velocity $\omega$.

Therefore, the amplitude $S_{21}$ of a composite vector is expressed by:

$$S_{21} = \{(a + m\cos\omega t)^2 + (m\sin\omega t)^2\}^{0.5} \qquad (3)$$
$$= (a^2 + 2am\cos\omega t + m^2)^{0.5}$$

The phase $\phi_{21}$ is expressed by:

$$\phi_{21} = \text{arc tan}\,[m\sin\omega t/(a+m\cos\omega t)] \qquad (4)$$

Since changes in the phase $\phi$ in terms of time represents the frequency, the frequency $f_{21}$ is expressed by:

$$f_{21} = d\phi_{21}/dt/2\pi \qquad (5)$$
$$= \omega m(a\cos\omega t + m)/2\pi(a^2 + 2am\cos\omega t + m^2)$$

Then, multiplying the equation (5) with a square of the equation (3):

$$f_{21} \times S_{21}^2 = \omega m(a\cos\omega t + m)/2\pi \qquad (6)$$

In this equation (6), the first term varies in a cosine form as the time t changes, while the second term is constant. Therefore, an average of the equation (6) over one cycle or over a long time is derived by the following equation (7):

$$E_{21}^2 = \text{Mean}[f_{21}/S_{21}^2]_t = \omega m^2/2\pi \qquad (7)$$

Thus, an output proportional to a square of a crosstalk amount m is derived.

If the pickup 2 is shifted toward a track 3, a vector m indicated in FIG. 2(B) rotates clockwise at an angular velocity $\omega$, and the amplitude $S_{23}$ of a composite vector is expressed by:

$$S_{23} = (a^2 + 2am\cos\omega t + m^2)^{0.5} \qquad (8)$$

the phase $\phi_{23}$ is expressed by:

$$\phi_{23} = \text{arc tan}\,[-m\sin\omega t/(a+m\cos\omega t)] \qquad (9)$$

and the frequency $f_{23}$ is expressed by:

$$f_{23} = -\omega m([a\cos\omega t + m)/2\pi(a^2 + 2am\cos\omega t + m^2) \qquad (10)$$

Thus, $f_{23} \times S_{23}^2$ and $E_{23}$ are respectively expressed by:

$$f_{23} \times S_{23}^2 = -\omega m(a\cos\omega t + m)/2\pi \qquad (11)$$

$$E_{23} = \text{Mean}\,[f_{23}/S_{23}^2] = -\omega m^2/2\pi \qquad (12)$$

It will be appreciated from the foregoing that the product obtained by multiplying an output value indicative of an FM-demodulated output signal from the pickup 2 with an AM-demodulated and squared value of an output signal from the pickup 2 results in a value proportional to a square of a crosstalk amount m, where the direction of inclination of the pickup is determined depending upon whether the product is positive (+) or negative (−).

From the above explained principle, in the crosstalk detecting apparatus shown in FIG. 1, the FM-demodulator 1 outputs a signal represented by the equation (5) or (10), the AM-demodulator 2 outputs a signal represented by the equation (3) or (8), the multiplier circuit 3 outputs a signal represented by the equation (6) or (11) and the LPF 6 outputs a signal represented by the equation (7) or (12) during the time period when the sampling circuit 5 samples a signal and supplies the sampled signal to the LPF 6 (i.e., at the time the pickup is reading the identification signal).

While in the above embodiment, a value proportional to a square of a crosstalk amount m is output as a signal representative of crosstalk, a square root circuit may be provided when the crosstalk value m itself is required.

Also, in the embodiment, the output of the AM-demodulator is squared before being supplied to the multiplier circuit. Alternatively, when the crosstalk amount is used as feed-back signal to a tracking servo for driving the pickup, it may be used as a feed-back signal even if there is no any square circuit 3.

Further, although specific configurations of the square circuit and the multiplier circuit are not shown in the embodiment, these circuits may be formed by discrete circuits. Alternatively, outputs from the FM- and AM-demodulators may be converted to digital values by analog-to-digital convertors and then processed by a processor, which performs operations corresponding to the square circuit and the multiplier circuit.

Figure 3:
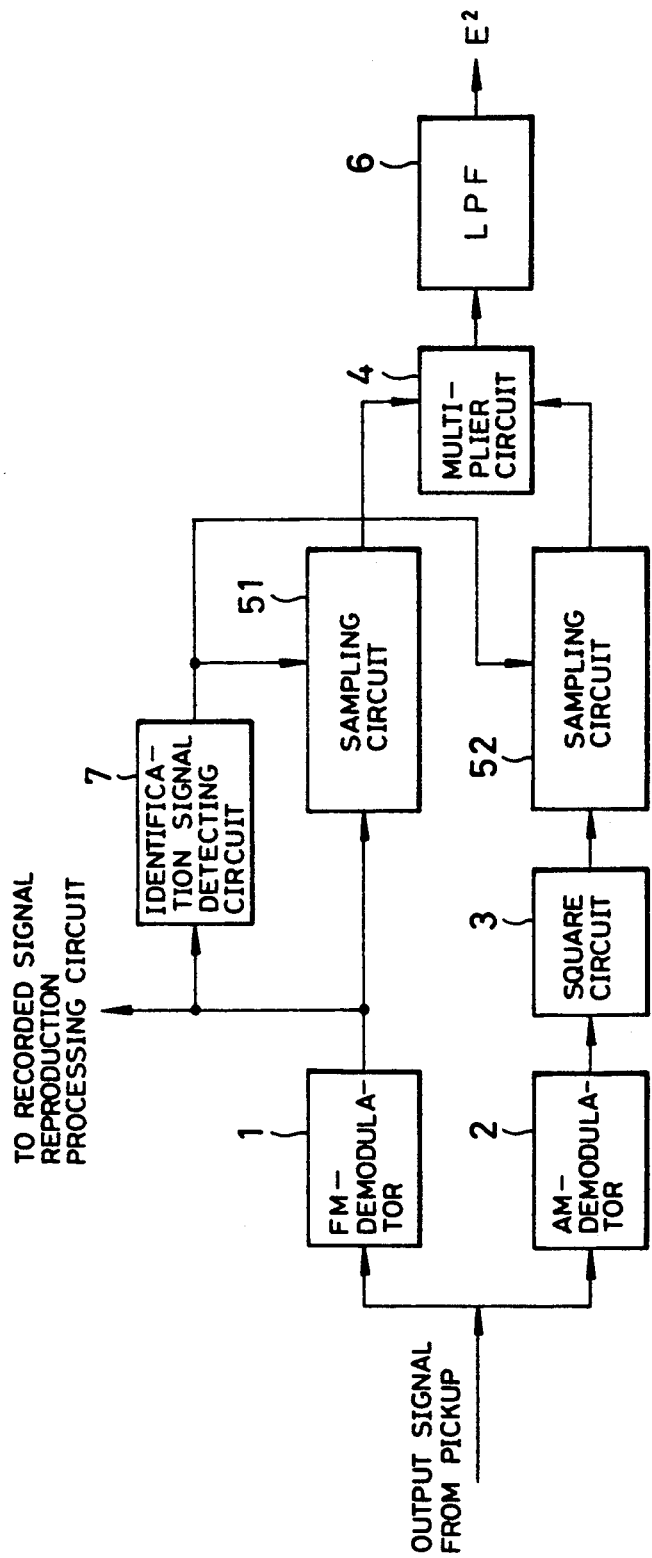
FIG. 3 is a block diagram illustrating the configuration of another embodiment of a crosstalk detecting apparatus according to the present invention.

FIG. 3 shows the configuration of another embodiment according to the present invention. In place of the sampling circuit 5 in the embodiment explained in connection with FIG. 1, the apparatus comprises a sampling circuit 51 for sampling an output from an FM-demodulator 1, and a sampling circuit 52 for sampling an output from a square circuit 3. A similar crosstalk value to that of the previous embodiment may be derived by multiplying the sampled values from the sampling circuits 51 and 52 with each other by means of a multiplier circuit 4. When the outputs from the FM-demodulator 1 and the AM-demodulator 2 are separately sampled by the provision of the two sampling circuits 51 and 52, and the operation of the multiplier circuit 4 is implemented by a processing operation executed by a processor, the processing operation can be performed at a low speed, thus making it possible to simplify the circuit.

As described above, the crosstalk detecting apparatus according to the present invention FM-demodulates a signal output from a pickup on the one hand, and AM-demodulates the same signal on the other hand, multiplies the FM-demodulated output with the AM-demodulated output, and derives a crosstalk value from an average of the multiplication result in terms of the time. This results in an apparatus of simple construction capable of deriving an accurate crosstalk amount.

While the present invention has hereinbefore been explained in connection with the preferred embodiments thereof, the present invention is not limited to these embodiments and a variety of modifications can be made in accordance with the appended claims.

What is claimed is:

1. A crosstalk detecting apparatus for detecting an amount of crosstalk which occurs when a signal is read from a medium, on which an image signal and an identification signal are FM-modulated and recorded using three tracks adjacent to one another, for a period in which the identification signal recorded on the medium is being read therefrom, said apparatus comprising:
   (a) FM demodulating means for FM-demodulating the signal read from the medium;
   (b) AM demodulating means for AM-demodulating the signal read from the medium;
   (c) multiplying means for multiplying an output signal from said FM demodulating means with an output signal from said AM demodulating means; and
   (d) averaging means for averaging an output from said multiplying means to detect the amount of crosstalk.

2. A crosstalk detecting apparatus according to claim 1, wherein said averaging means comprises a low pass filter.